United States Patent
Aldigeri

(10) Patent No.: US 12,109,741 B2
(45) Date of Patent: Oct. 8, 2024

(54) COMPRESSION MOULDING APPARATUS

(71) Applicant: SACMI COOPERATIVA MECCANICI IMOLA SOCIETA' COOPERATIVA, Imola (IT)

(72) Inventor: Gianluca Aldigeri, Imola (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 0 days.

(21) Appl. No.: 17/769,633

(22) PCT Filed: Oct. 16, 2020

(86) PCT No.: PCT/IB2020/059774
§ 371 (c)(1),
(2) Date: Apr. 15, 2022

(87) PCT Pub. No.: WO2021/074887
PCT Pub. Date: Apr. 22, 2021

(65) Prior Publication Data
US 2023/0068378 A1    Mar. 2, 2023

(30) Foreign Application Priority Data

Oct. 16, 2019    (IT) .......................... 102019000018965

(51) Int. Cl.
*B29C 43/34* (2006.01)
*B29C 43/02* (2006.01)
(Continued)

(52) U.S. Cl.
CPC .............. *B29C 43/34* (2013.01); *B29C 43/02* (2013.01); *B29C 43/50* (2013.01);
(Continued)

(58) Field of Classification Search
CPC .... B29C 2043/3472; B29C 2043/3277; B29C 2043/5084
See application file for complete search history.

(56) References Cited

U.S. PATENT DOCUMENTS 7,407,376 B2    8/2008   Steele
7,621,735 B2 *  11/2009  Mattice ................. B29C 31/048
                                                    425/297
(Continued)

FOREIGN PATENT DOCUMENTS

CA    2190949 A1    11/1995
CA    2190949 C     10/2005
(Continued)

OTHER PUBLICATIONS

Office Action and Search Report from Chinese Patent Application No. 2020800818822, issued Jan. 18, 2024, English translation attached, 21 pages.
(Continued)

*Primary Examiner* — Farah Taufiq
*Assistant Examiner* — Timothy G Hemingway
(74) *Attorney, Agent, or Firm* — Pearne & Gordon LLP; J. Gregory Chrisman

(57) ABSTRACT

An apparatus comprises:
at least one mould for forming an object from a dose of polymeric material;
a conveying device having a central support rotatable about a first axis the conveying device comprising at least one conveying element movable along a first closed path for collecting the dose and subsequently releasing the dose in the mould;
a removing device having a central body rotatable about a second axis, the removing device comprising at least one removing element movable along a second closed path for conveying the object away from the mould.

(Continued)

The first axis is distinct from the second axis and at least one point exists at which one path selected from between the first closed path and the second closed path overlaps another path selected from between the second closed path and the first closed path.

16 Claims, 8 Drawing Sheets

(51) Int. Cl.
    *B29C 43/32*     (2006.01)
    *B29C 43/50*     (2006.01)
    *B29L 31/00*     (2006.01)

(52) U.S. Cl.
    CPC ............ *B29C 2043/3277* (2013.01); *B29C 2043/3472* (2013.01); *B29C 2043/5084* (2013.01); *B29L 2031/7174* (2013.01)

(56) References Cited

U.S. PATENT DOCUMENTS

| | | | |
|---|---|---|---|
| 7,815,837 B2 | 10/2010 | Steele | |
| 8,794,954 B2* | 8/2014 | Aldigeri | B29C 37/0007 |
| | | | 425/297 |
| 9,573,309 B2 | 2/2017 | Hirota et al. | |
| 2006/0034960 A1 | 2/2006 | Pucci et al. | |
| 2006/0121149 A1* | 6/2006 | Zanoni | B29C 43/50 |
| | | | 425/503 |
| 2007/0001338 A1 | 1/2007 | Daniel et al. | |
| 2009/0014915 A1 | 1/2009 | Hirota et al. | |
| 2012/0201920 A1 | 8/2012 | Aldigeri et al. | |
| 2013/0334728 A1 | 12/2013 | Hirota et al. | |
| 2018/0297246 A1 | 10/2018 | Pucci et al. | |

FOREIGN PATENT DOCUMENTS

| | | |
|---|---|---|
| CN | 1780721 A | 5/2006 |
| CN | 101890769 | 11/2010 |
| CN | 102596530 A | 7/2012 |
| CN | 105128303 A | 12/2015 |
| EP | 1631427 A1 | 3/2006 |
| EP | 3150355 A1 | 4/2017 |
| TW | 200722261 A | 6/2007 |
| WO | 2004039553 A1 | 5/2004 |
| WO | 2004096515 A1 | 11/2004 |
| WO | 2011010294 A1 | 1/2011 |
| WO | 2012121325 | 9/2012 |

OTHER PUBLICATIONS

Office action issued in TW 0223767692 on Apr. 8, 2024, 15 pages.

* cited by examiner

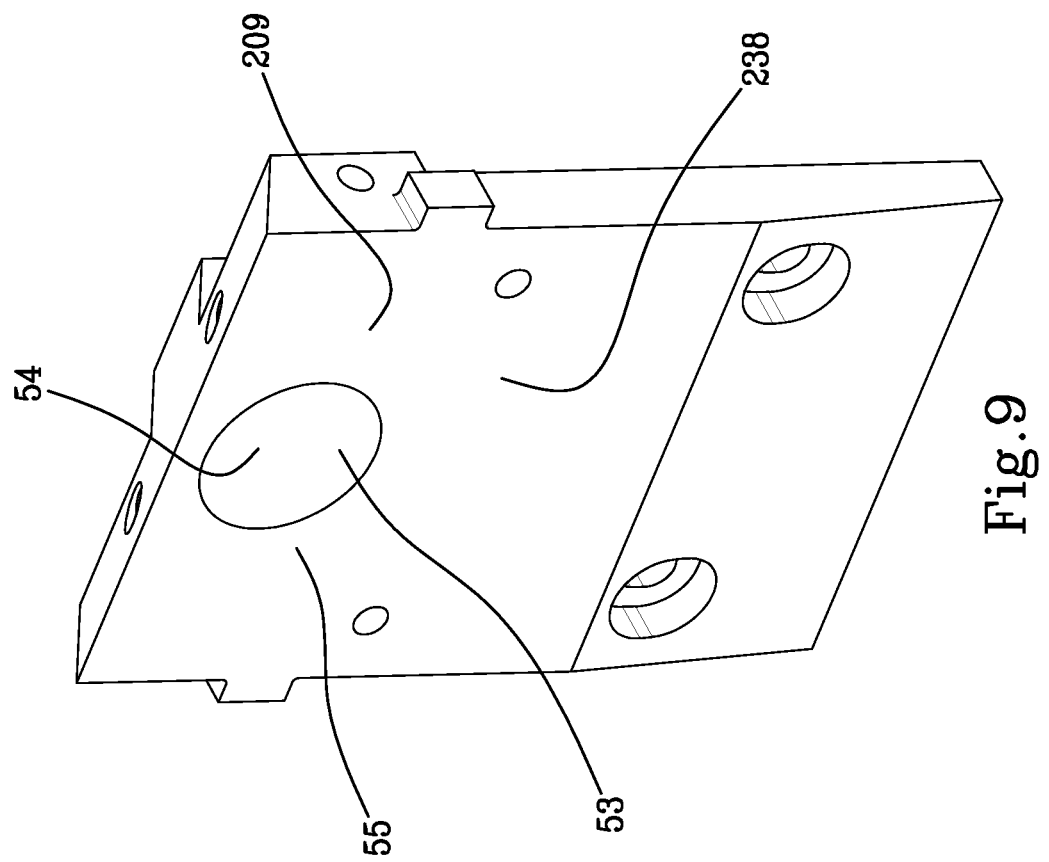
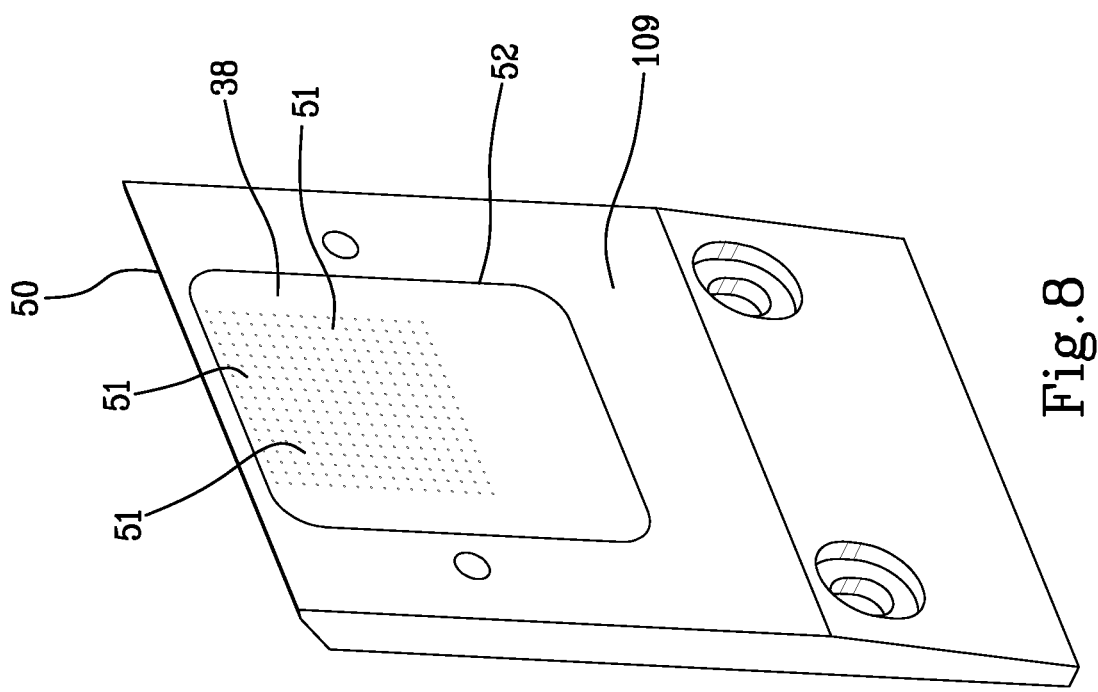

COMPRESSION MOULDING APPARATUS

This invention relates to an apparatus suitable for producing objects by compression moulding doses of polymeric material.

The apparatus according to the invention may be used, for example, for producing capsules intended to contain a powdered or granular substance such as coffee or the like, arranged for preparing beverages or other food fluids. Alternatively, the apparatus according to the invention may be used for producing preforms intended to be subjected to a blow moulding or stretch-blow moulding process to form containers, such as bottles. More generally speaking, the apparatus according to the invention may be used for producing containers of any type, such as, for example cups, jars or bowls, or other objects, particularly, but not exclusively, having a concave geometry, such as caps.

The apparatus according to the invention allows the production of objects made with a single material, starting from any polymeric material which can be subjected to compression moulding. Alternatively, the apparatus according to the invention allows the production of concave objects having a multilayer structure, that is to say, having a wall formed by two or more layers placed side by side made of polymeric materials different to each other.

Apparatuses are known for producing objects by compression moulding dosed quantities of polymeric material. The known apparatuses comprise an extruder for dispensing a polymeric material and a plurality of moulds, each of which comprises a male part having a punch and a female part having a cavity, the female part being positioned below the male part. The moulds are positioned in a peripheral region of a moulding carousel, rotatable about a vertical axis. The known apparatuses further comprise a conveying carousel, comprising a plurality of conveying elements rotatingly movable about a further vertical axis. During rotation, each conveying element passes near the extruder, from which it collects a dose of polymeric material. Subsequently, the conveying element in question passes above the female part of a mould and releases the dose inside the respective cavity, so that the dose can be shaped between the female part and the male part of the mould, to obtain the desired object. A removing carouse is further provided, the removing carousel having a plurality of removing elements each of which is suitable for receiving an object that has just been formed and extracted from the mould, in order to convey the object far from the moulding carousel.

The removing carousel is coaxial with the conveying carousel, that is to say, it is rotatable about the same vertical axis about which also the conveying carousel rotates. Each removing element is axially aligned with a conveying element and is above the corresponding conveying element. In this way, when a mould is in an open position, a conveying element and a removing element are simultaneously introduced between the male part and the female part. While the conveying element deposits a dose in the cavity of the female part, the removing element receives an object from the male part of the same mould, the object being ready to be moved away from the moulding carousel.

A drawback of the compression moulding apparatuses of the type described above is that, in the open position of the mould, the male part and the female part must be at a considerable distance from each other, so as to make it possible to insert both a conveying element and a removing element between the male part and the female part.

The situation worsens for certain types of conveying elements, for example for conveying elements which, in addition to being rotatable about the axis of the conveying carousel, are supported by an arm rotatable about an axis positioned for example radially, relative to a central body of the conveying carousel. These conveying elements are delimited by a flat conveying surface intended to come into contact with the dose. The conveying surface is in a substantially vertical configuration when the conveying element collects the dose from the extruder (collecting configuration), and in a substantially horizontal configuration when the dose is released in the cavity of the mould (release configuration). It may occur that, when the conveying element starts to be interposed between the female part and the male part of a mould, the conveying surface is not yet positioned horizontally, but is in a tilted position and consequently needs a significant space in an axial direction, in order to be inserted between the female part and the male part.

Even certain types of doses, for example elongate cylindrical doses, require conveying elements having a considerable axial dimension, which can be inserted between the female part and the male part of the mould only if the latter are positioned at a sufficient distance from each other, in the open position.

Positioning the female part and the male mould part at a considerable distance from each other in the open position causes an increase in the dimensions of the moulding carousel and of the stroke of the actuator associated with each mould to open or close the mould.

In addition to the traditional motor device which rotates the conveying carousel about the corresponding axis, the conveying elements of the type described above require a driving device which rotates each arm of the conveying element, so as to move the conveying surface between the collecting configuration and the release configuration.

Some examples of known compression moulding apparatuses are disclosed in WO 2004/096515 and in EP 3150355.

An object of the invention is to improve the known apparatuses for obtaining objects made of polymeric material by compression moulding.

A further object is to provide a compression moulding apparatus in which the distance between a female part and a male part of a mould, in an open position of the mould, is not excessive.

A further object is to keep limited the distance between the female part and the male part of a mould, in the open position, without excessively penalizing the cooling of the object formed.

Another object is to improve the conveying devices for conveying a dose of polymeric material towards a mould of a compression moulding apparatus.

Another object is to provide a conveying device having a conveying element configured to perform two separate movements, wherein the conveying element can be moved in a reliable and precise manner between a first orientation with which a dose is received by the conveying element, and a second orientation with which the dose is released in the mould by the conveying element.

In a first aspect of the invention, there is provided an apparatus comprising:
  at least one mould for forming an object from a dose of polymeric material;
  a conveying device having a central support rotatable about a first axis, the conveying device further comprising at least one conveying element movable along a first closed path for collecting a dose or alternatively releasing the dose in a mould;

a removing device having a central body rotatable about a second axis, the removing device further comprising at least one removing element movable along a second closed path for conveying a formed object away from by the mould;

wherein the first axis is distinct from the second axis and at least one point exists at which one path selected from between the first closed path and the second closed path overlaps another path selected from between the second closed path and the first closed path.

More specifically, the at least one removing element is movable along the second closed path for conveying the object from the mould towards an outfeed conveyor.

In particular, the at least one removing element is configured to receive the object in a removing position in which the removing element is interposed between a female part and a male part of the mould.

Owing to the first aspect of the invention, it is possible to obtain an apparatus in which the first closed path, that is to say, the path of the conveying element, is offset, in plan view, relative to the second closed path, that is, the path of the removing element.

In this way, the conveying element can release the dose in a mould arranged in a position different from the position in which the removing element removes the formed object from the mould. In other words, the conveying element does not release the dose in the mould at the same moment in which the removing element removes the formed object from the mould, but the conveying element and the removing element interact with a same mould at different moments. Consequently, it is not necessary for the conveying element and the removing element to be simultaneously interposed between a male part and a female part of the mould. This makes it possible to reduce the distance between the male part and the female part of the mould, in the position of maximum opening of the latter, that is to say, in the position in which the male part and the female part are furthest from each other. Consequently, the dimensions of the mould are reduced and the structure of the apparatus is simplified, particularly as regards the stroke of an actuator arranged to move the male part and the female part away from or towards each other.

At the same time, the first closed path, that is to say, the path of the conveying element, and the second closed path, that is to say, the path of the removing element, overlap at least at one point. That means that the first closed path and the second closed path remain close to each other so that the object formed in the mould can be effectively cooled.

In fact, the formed object s effectively cooled when it is in contact both with the female part and with the male part of the mould, that is, when the mould is arranged in a closed position. In this position, the formed object may benefit both from the cooling action performed by the female part of the mould and the cooling action performed by the male part. Both the female part and the male part are in fact usually provided with respective cooling circuits. When the formed object is still inside the mould, but the female part and the male part are spaced from each other, the formed object may benefit from the cooling action performed only by one part of the mould, that is to say, by the part of the mould with which the object formed is in contact. Consequently, the cooling efficiency is reduced.

In the apparatus according to the first aspect of the invention, the first closed path and the second closed path extend about distinct axes and are not therefore completely overlapped. However, the first closed path and the second closed path overlap at least at one point, which means that these paths are relatively close to each other. This makes it possible not to increase too much the time in which the female part remains spaced from the male part, and consequently the formed object remains in contact with a single part of the mould. The parts of the mould can therefore cool the formed object with a good effectiveness.

In an embodiment, said at least one mould comprises a male part and a female part.

The male part can be arranged below the female part.

This arrangement of the male part and the female part is particularly suitable for obtaining certain types of products, such as capsules for coffee or other food products.

In an embodiment, the apparatus comprises a dispensing device for dispensing at least a polymeric material.

The dispensing device may comprise an outfeed opening facing downwards.

This allows a continuous extrudate to be dispensed downwards, for example along a vertical or substantially vertical outfeed direction.

Providing a dispensing device which dispenses a continuous extrudate from the top towards the bottom allows a dose of polymeric material to be positioned on a mould male part arranged below a mould female part.

The arrangement of the dispensing device and of the mould parts that was disclosed above, in which the dispensing device has an outfeed opening facing downwards and in which the mould male part is arranged below the mould female part, can be easily adopted because the first closed path (i.e. the path of the conveying element) is offset, in a plan view, relative to the second closed path (i.e. the path of the removing element).

By offsetting—in a plan view—the path of the conveying element relative to the path of the removing element, interferences can be avoided between the dispensing device and the removing element, These interferences would make it difficult or even impossible to correctly dispense the continuous extrudate and deliver the dose to the conveying element. These interferences are avoided because the second closed path, i.e. the path of the removing element, is at a distance from the outfeed opening of the dispensing device, i.e. laterally displaced relative to the outfeed opening, so that the removing element does not pass below the outfeed opening.

In an embodiment, the first closed path comprises at least a first circular portion and the second closed path comprises at least a second circular portion.

The first circular portion has a radius less than the radius of the second circular portion.

Thus, the second closed path (i.e. the path of the removing element) can protrude, in a plan view, towards the outfeed conveyor, with respect to the first closed path (i.e., the path of the conveying element). This allows to optimize how the outfeed conveyor is positioned and to reduce the dimensions of the apparatus.

Furthermore, the centrifugal force acting on the objects conveyed by the removing element along the second path is reduced.

In a second aspect of the invention, there is provided an apparatus comprising at least one conveying element for conveying a dose of polymeric material dispensed by a dispensing device towards a mould, the conveying element being configured to perform a first movement by moving along a path directed from the dispensing device towards the mould, so as to bring the dose to the mould, and wherein the conveying element is configured to perform, in addition to the first movement, a second movement by rotating about an axis, so as to turn the dose from a first orientation with which the dose is received by the conveying element, to a second orientation with which the dose is released by the conveying element in the mould, the apparatus further comprising a movement device for moving said at least one conveying element, the movement device comprising two cams arranged to operate in conjunction with each other so that said at least one conveying element rotates about said axis while it is displaced along said path.

The apparatus according to the second aspect of the invention allows the conveying element to be moved in a simple and precise manner, both with regard to the first movement and with regard to the second movement.

The invention can be better understood and implemented with reference to the accompanying drawings which illustrate non-limiting example versions of it and in which:

FIG. 8 is a perspective view of a conveying element according to an alternative embodiment;

FIG. 9 is a perspective view of another alternative embodiment of a conveying element;

Figure 1:
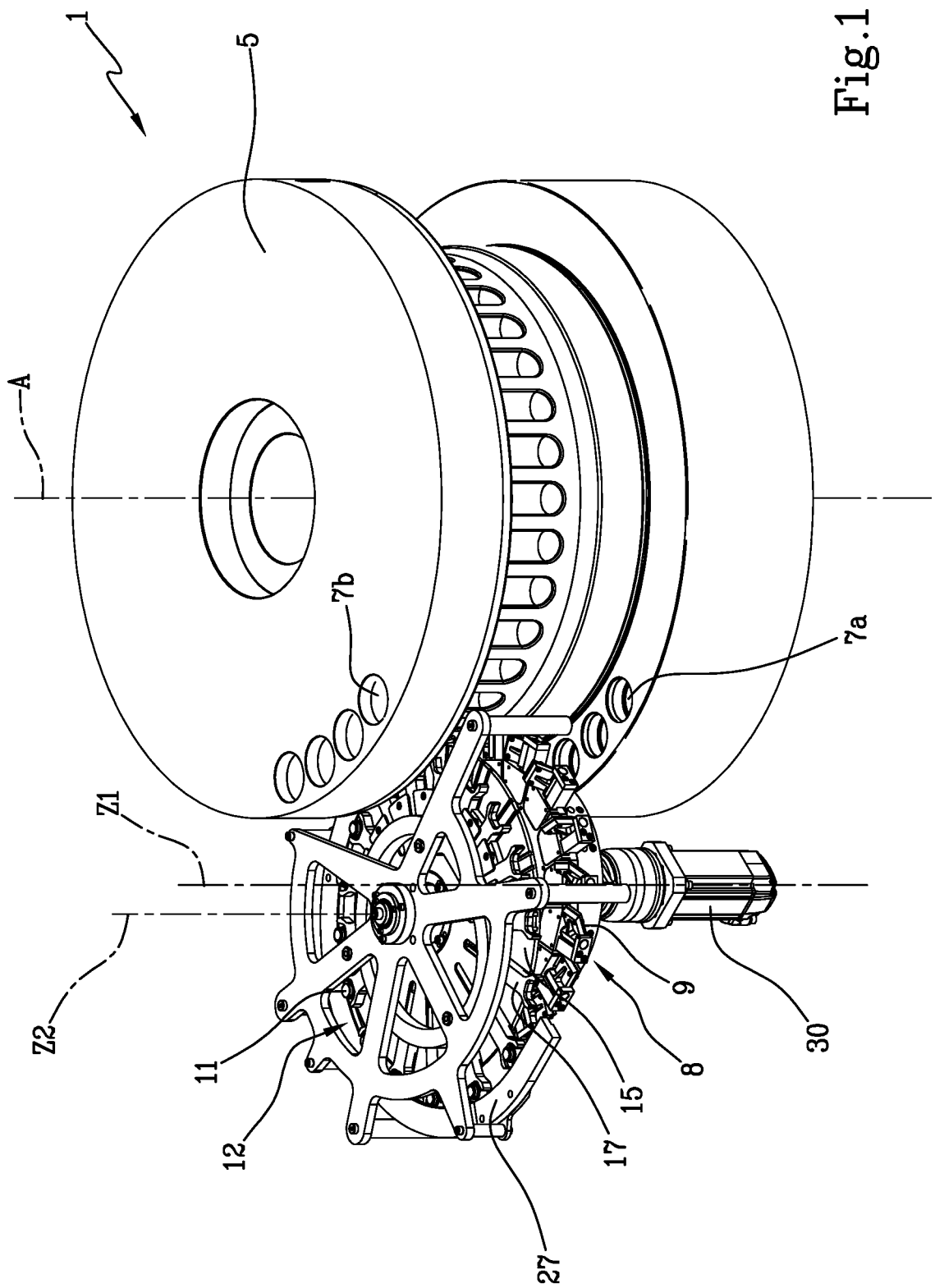
FIG. 1 is a perspective view showing an apparatus for producing objects by compression moulding.

FIG. 1 shows an apparatus 1 for producing objects made of polymeric material by compression moulding. The objects which the apparatus 1 can produce may be concave objects, particularly containers, such as, for example, capsules for coffee or other substances containing ingredients which can be extracted by means of a fluid, or jars, cups or bowls. Alternatively, the apparatus 1 may be used for producing preforms intended to form containers by blow-moulding, or caps. However, the apparatus 1 also allows the production of non-concave objects.

The apparatus 1 comprises a dispensing device 2 for dispensing at least a polymeric material. The dispensing device 2 is visible in FIGS. 3, 4 and 10 and is shown schematically also in FIG. 6.

The dispensing device 2 can comprise a co-extrusion device for dispensing a continuous extrudate comprising a plurality of layers of polymeric materials different to each other.

Alternatively, the dispensing device 2 may comprise an extrusion device arranged for extruding a single material continuous extrudate, that is to say, an extrudate made with a single polymeric material instead of a plurality of polymeric materials different to each other.

Figure 2:
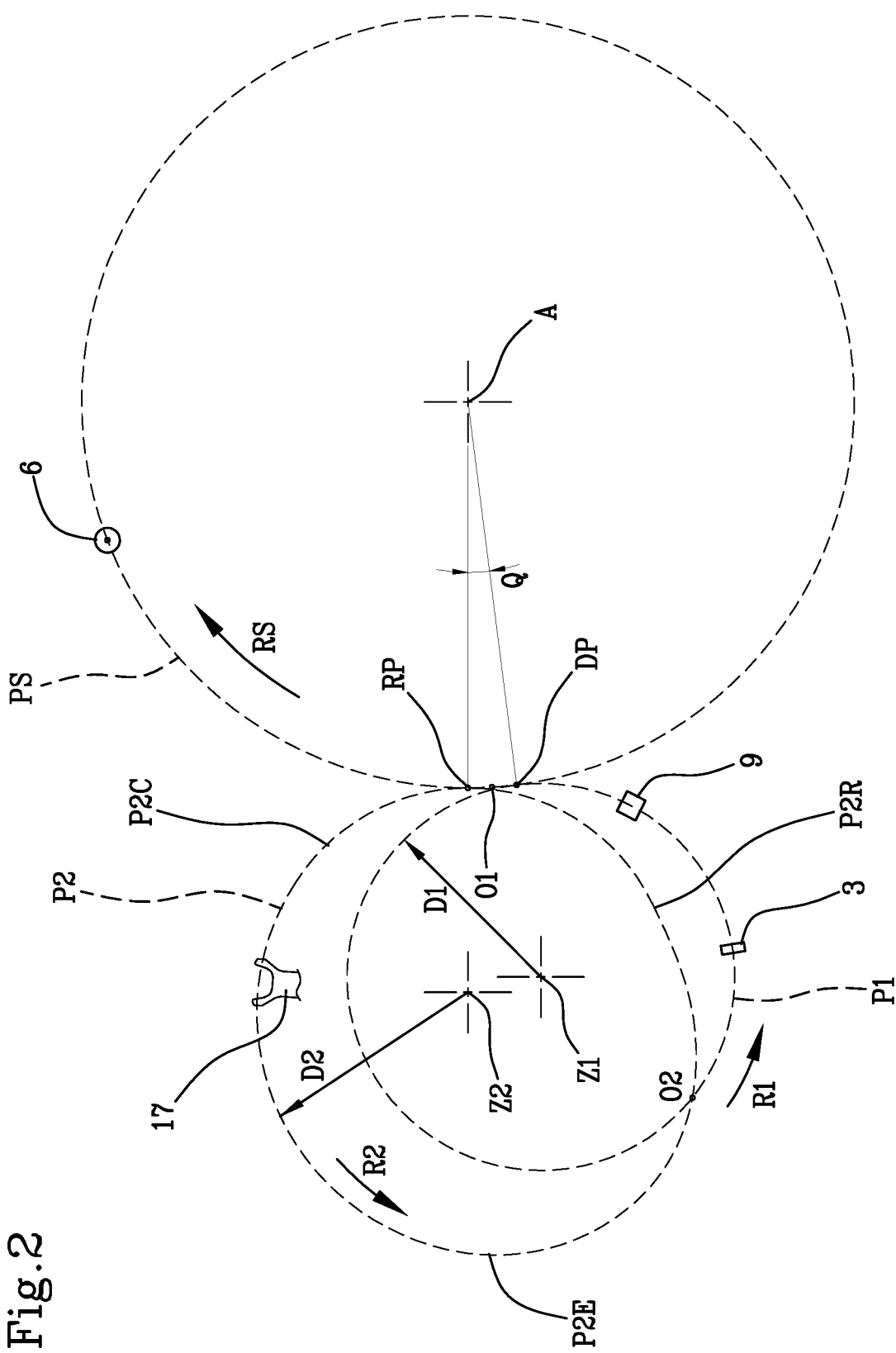
FIG. 2 is a schematic plan view, showing the paths of a conveying element, of a mould and of a removing element of the apparatus of FIG. 1.
Figure 10:
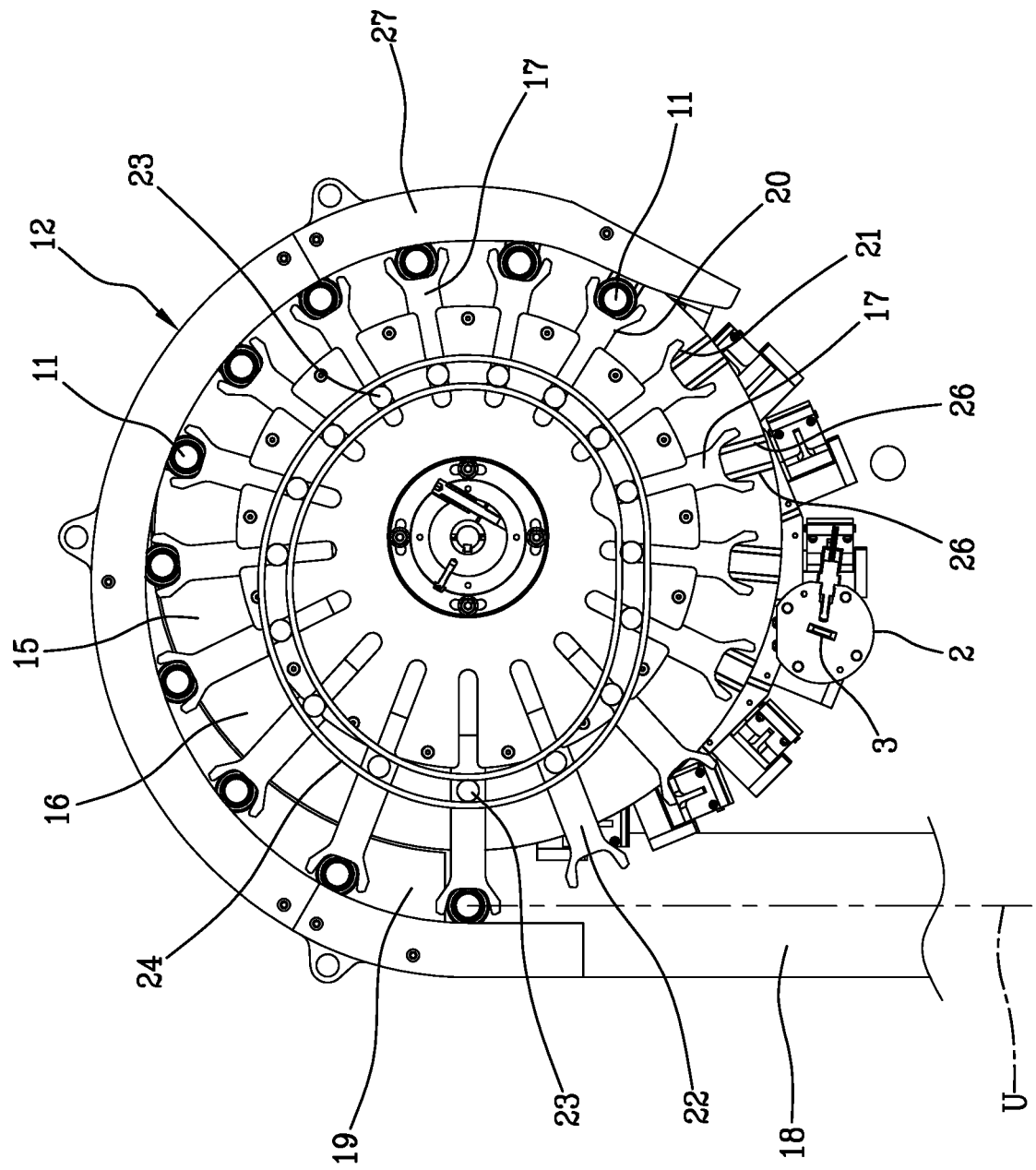
FIG. 10 is a top view of a removing device of the apparatus of FIG. 1, in which some parts have been removed for the sake of clarity.

As shown in FIGS. 2 and 10, the dispensing device 2 has an outfeed opening 3 having a rectangular or square shape, so as to dispense a continuous extrudate shaped like a strip having a cross-section which is rectangular or square. If the cross-section of the strip is rectangular, the base of the rectangle may be much greater than the height, even if this condition is not necessary.

Figure 6:
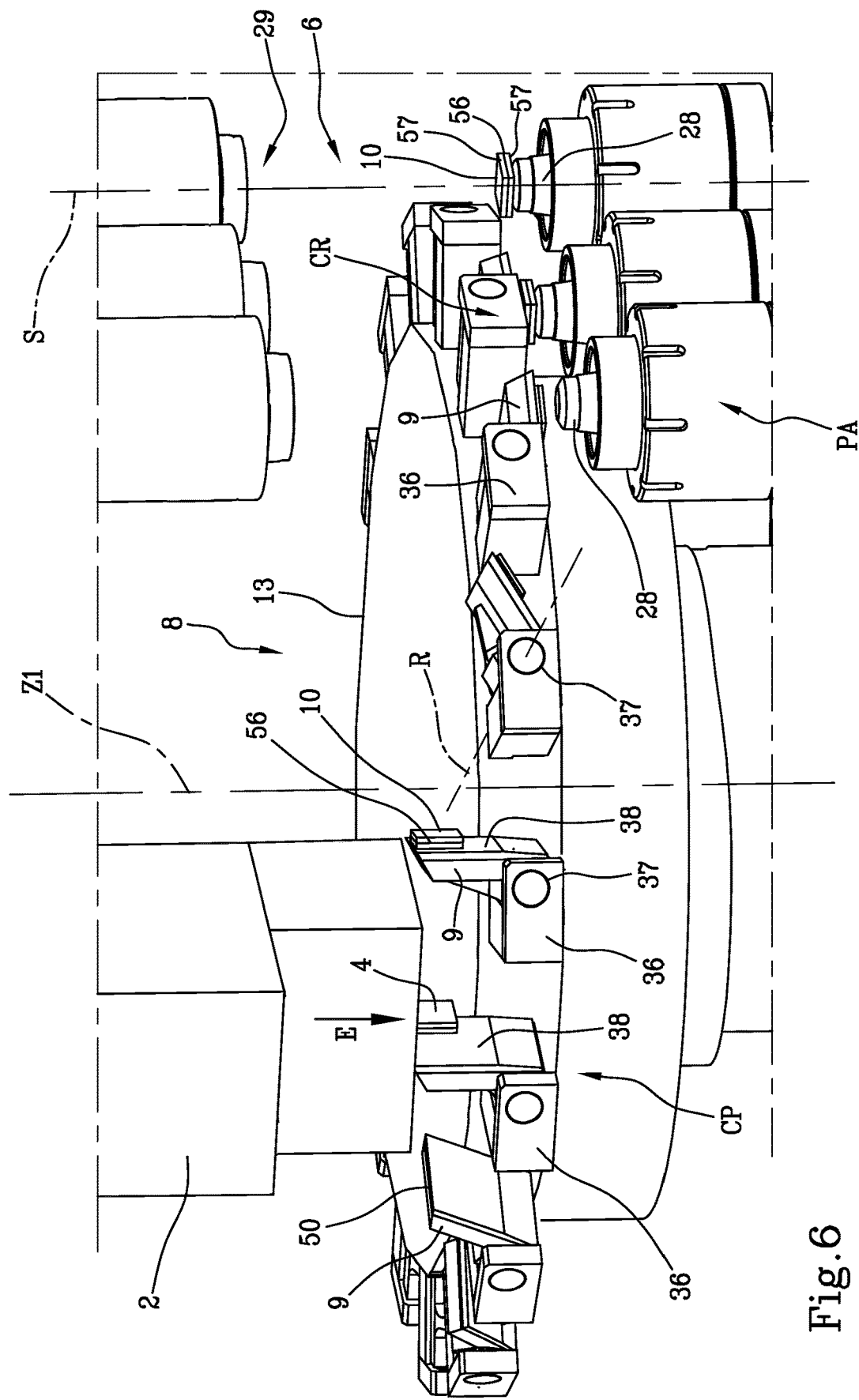
FIG. 6 is a perspective view showing a conveying device of the apparatus of FIG. 1, in which some parts have been removed for the sake of clarity.

In the example shown, as can be seen in FIG. 6, the outfeed opening 3 faces downwards. The dispensing device 2 is configured for dispensing a continuous extrudate 4 downwards, along an outfeed direction E which is vertical or substantially vertical. However, this condition is not necessary. The apparatus 1 further comprises a moulding device, which, in the example shown, is shaped like a moulding carousel 5, shown schematically in FIG. 1. The moulding carousel 5 is rotatable about a respective axis A which, in the example illustrated, is positioned vertically. The moulding carousel 5 is provided, in a peripheral region thereof, with a plurality of moulds 6 each of which is configured for shaping a dose of polymeric material, obtained by cutting the continuous extrudate 4, in such a way as to obtain an object 11 by compression moulding.

In the representation of FIG. 1, the moulds 6 are not shown, but only some housing holes 7a, 7b intended to house corresponding moulds 6 are shown. It is understood that the housing holes 7a, 7b, and consequently the moulds 6, are distributed, for example in a angularly equidistant manner, along the entire periphery of the moulding carousel 5. Some moulds 6 are visible in FIG. 6.

As shown in FIG. 2, the moulds 6 move along a trajectory PS, which in the example shown is shaped like a closed path, for example a circular path centred on the axis A.

As shown in FIG. 6, each mould 6 comprises a male part 28 and a female part 29, aligned with each other along a moulding axis S which in the example shown is vertical. In the example shown, the male part 28 is positioned below the female part 29, but this condition is not necessary. In effect, other reciprocal arrangements of the male part 28 and of the female part 29 are possible.

The male part 28 and the female part 29 of each mould 6 are movable relative to each other between a position of maximum opening PA, shown in FIG. 6, and a forming position not illustrated. In the position of maximum opening PA, the male part 28 and the female part 29 are spaced apart from each other and are at a mutual distance which is at a maximum. In the forming position, the male part 28 and the female part 29 are close to each other, in such a way that between the male part 28 and the female part 29 it is possible to define a forming chamber having a shape corresponding to the shape of the object to be formed.

The apparatus 1 comprises an actuating device for moving the male part 28 and the female part 29 between the position of maximum opening PA and the forming position. In the example shown, the actuating device is associated with the male part 28, which is moved along the corresponding moulding axis S whilst the female part 29 remains in a fixed position along the moulding axis S. In an alternative embodiment, however, it is possible to move only the female part 29 along the moulding axis S, or move both the female part 29 and the male part 28 along the moulding axis S. The actuating device may be, for example, hydraulic, or mechanical, such as a cam.

Between the dispensing device 2 and the moulding carousel 5 a conveying device 8 is interposed, which in the example shown is shaped like a conveying carousel. The conveying device 8 comprises a plurality of conveying elements 9, more clearly visible in FIG. 6, each of which is arranged for conveying, towards the moulding carousel 5, a dose 10 of polymeric material which has been separated from the polymeric material coming out from the dispensing device 2.

As can be more clearly seen in FIG. 6, the conveying device 8 comprises a central support 13 that, in the example illustrated, is shaped like a drum having a substantially cylindrical geometry. The central support 13 is rotatable about a first axis Z1 owing to a driving system which will be described in more detail below. The first axis Z1 may be substantially vertical.

The conveying elements 9 are supported by the central body 13, in a peripheral region of the latter.

When the central support 13 rotates about the first axis Z1, the conveying elements 2 move along a first path P1, shown in FIG. 2, directed from the dispensing device 2 towards the mould 6, so as to bring the dose 10 to the mould 6. This movement defines a first movement of the conveying elements 2. As shown in FIG. 2, the first path P1 is at the minimum distance from (for example overlaps) the trajectory PS of the moulds 6, or more specifically of a part of the moulds 6 which in the examples shown is the male part 28, at least at a point corresponding to a delivery position DP, in which a dose 10 can be delivered by a conveying element 9 to a corresponding mould 6.

The first path P1 is a closed path, in particular a circular path around the first axis Z1. In the example shown, the first path P1 is, in plan view, tangential to the trajectory PS of the moulds 6 in the delivery position DP. In an alternative embodiment not illustrated, the first path P1 could be a closed non-circular path. The closed non-circular path is particularly suitable if it is desired that the first path P1, that is, the path of the conveying elements 9, overlaps the trajectory PS that of the moulds 6 not only at one point, but in a portion of greater length. This allows the conveying element 9 to remain superposed on a part of the mould 6 (for example, on a male part of the mould 6, as described in more detail below), for a sufficiently long time to ensure that the dose 10 is released in the mould 6 without positioning defects.

Each conveying element 9 is further configured to perform, in addition to the first movement and during the first movement, a second movement by rotating about an axis of rotation thereof, which is denoted by R in FIG. 6 and shown for a single conveying element 9. This second movement makes it possible to modify the orientation of the dose 10, as described in more detail below.

The apparatus 1 further comprises a removing device 12, configured to move the objects 11, that were formed by compression moulding the doses 10, away from the moulds 6.

Figure 3:
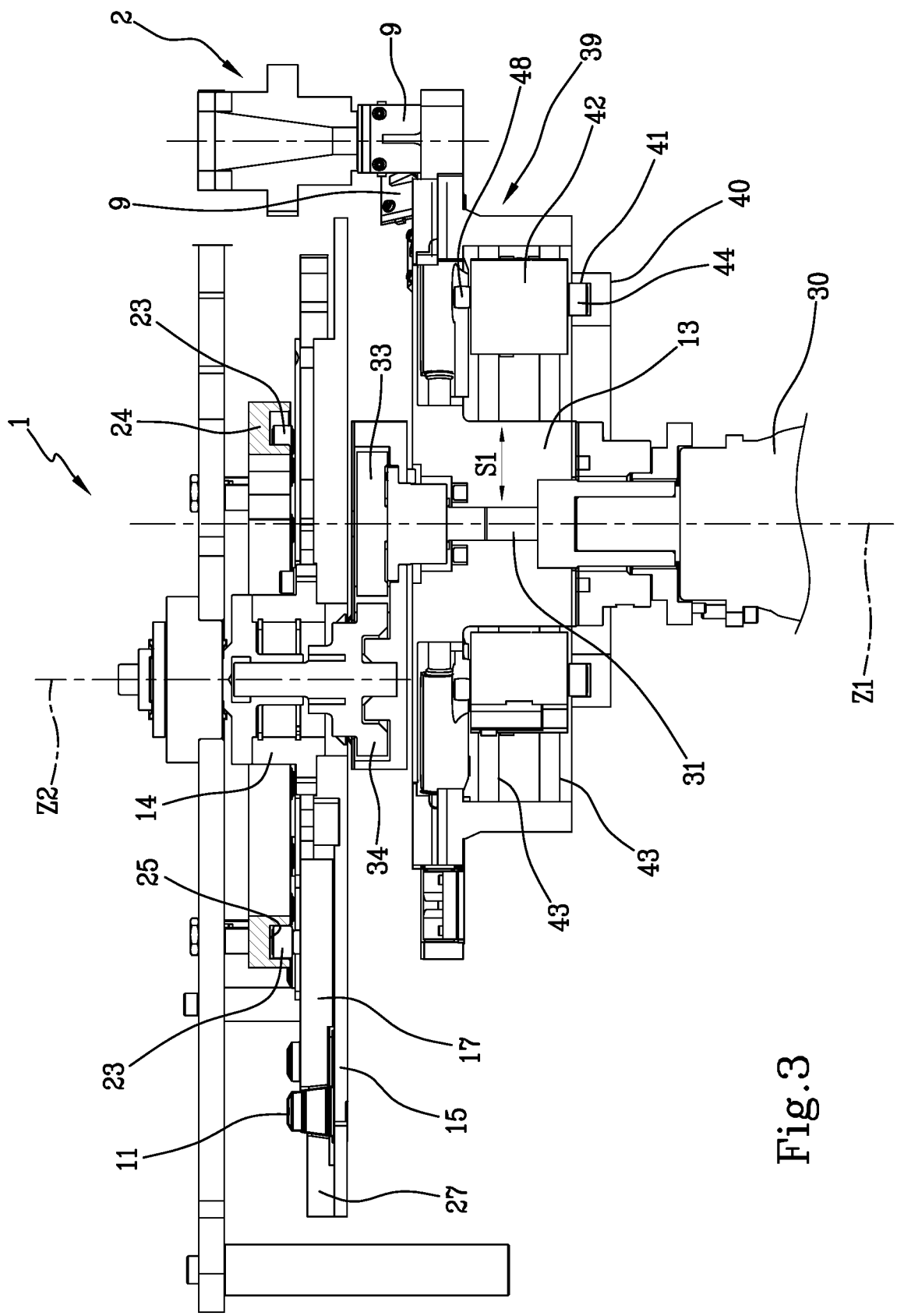
FIG. 3 is a cross section, taken in a vertical plane, of the apparatus of FIG. 1.

As shown in FIG. 3, the removing device 12 comprises a central body 14 rotatable about a second axis Z2, which in the example shown is vertical. The second axis Z2 is distinct from the first axis Z1 about which the central support 13 of the conveying device 8 is rotatable, that is to say, it does not coincide with the first axis Z1. In particular, the second axis Z2 may be parallel to the first axis Z1, and both these axes may be parallel to the axis A of the moulding carousel 5.

The removal device 12 further comprises a supporting disc 15, fixed relative to the central body 14. The supporting disc 15 is thus rotatable about the second axis Z2 together with the central body 14. The supporting disc 15 is delimited by an upper surface 16, suitable for restingly receiving the objects 11 which have to be moved away from the moulding carousel 5.

The removing device 12 further comprises a plurality of removing elements 17, each of which is suitable for collecting an object 11 extracted from the corresponding mould 6 and for conveying the object 11 away from the moulding carousel 5. The removing element 17 can receive the object 11 from the mould 6 assisted by an extracting element which detaches the object 11 from the mould 6 or, in an embodiment that is not shown, assisted by another component, for example a chute. In both cases, the removing element 17 is arranged to convey the object 11 from the mould 6 towards an outfeed conveyor 18. The latter can be for example shaped like a belt conveyor, positioned downstream of the removing device 12 for receiving from the removing elements 17 corresponding objects 11 and moving the objects 11 away from the apparatus 1. The outfeed conveyor 18, which is shown schematically in FIG. 10, may extend along a respective outfeed axis U.

Between the removing device 12 and the outfeed conveyor 18 an intermediate support 19 is provided, shown schematically in FIG. 10. The intermediate support 19 is suitable for temporarily supporting the objects 11 while the removing elements 17 move the objects 11, previously rested on the supporting disc 15, towards the outfeed conveyor 18.

Each removing element 17 comprises a conveying portion 20 suitable for engaging with an object 11 for conveying the object from the mould 6 towards the outfeed conveyor 18. The conveying portion 20, which may be C-shaped, has a seat 21 in which an object 11 can be received. In the example shown, the conveying portion 20 interacts with a lateral wall of the object 11, so as to exert on the lateral wall a pushing action which moves the object 11 towards the outlet conveyor 18. In the example shown, each object 11 is positioned on the supporting disc 15 in an upside-down configuration, that is to say, with a concavity of the object 11 facing towards the supporting disc 15. However, this condition is not necessary.

Each removing element 17 further comprises an elongate portion 22, which projects from the conveying portion 20 towards the axis Z2. The elongate portions 22 may be positioned substantially radially relative to the axis Z2.

The removing elements 17 are positioned above the supporting disc 15, in such a way that the respective conveying portions 20 are at a short distance from the supporting disc 15. In this way, if the object 11 has a flange extending from an edge of the object 11, the flange may rest on the supporting disc 15 and be interposed between the supporting disc 15 and the corresponding removing element 17, while the object 11 is conveyed by the latter.

Each removing element 17 is provided with a cam follower 23, for example shaped like a roller, which may be provided on a surface of the removing element 17 opposite the supporting disc 15, that is to say, on an upper surface of the removing element 17.

The cam followers 23 of the removing elements 17 are suitable for engaging with a cam element 24, located in a fixed position on the apparatus 1. In the example shown, the cam element 24 is positioned above the supporting disc 15 and the removing elements 17. In particular, the cam element 24 may have a cam track 25, shaped for example like a groove, in which the cam followers 23 can move.

As shown in FIG. 10, the points of the cam track 25 are at non-constant distances from the second axis Z2. The removing elements 17 are supported by the supporting disc 15 in such a way as to be slidable, in a radial direction, relative to the supporting disc 15. For this purpose, on the supporting disc 15 there may be radial guides 26, shaped for example as grooves, in which corresponding protrusions of the removing elements 17 engage.

The apparatus 1 further comprises a guiding element 27 suitable for interacting with the objects 11, for example with a lateral wall of the objects 11, in such a way that the objects 11 are guided while they are conveyed towards the conveyor 18. The guiding element 27, which may have an arched shape, is positioned outside the conveying portions 20, that is to say, it is located in a position further from the axis Z2 relative to the conveying portions 20.

The guiding element 27 is mounted in a fixed position on the apparatus 1. During operation, the central body 14 and with it the supporting disc 15 are rotated continuously about the second axis Z2. The removing elements 17, supported by the supporting disc 15, are also rotated about the second axis Z2. The cam followers 23 associated with the removing elements 17 move along the cam track 25 of the cam element 24. As the cam followers 23 move along the cam track 25, the distance of each cam follower 23 from the second axis Z2 is varied. Consequently, the removing elements 17, guided by the radial guides 26, move in a radial direction relative to the supporting disc 15.

In more detail, each removing element 17 is movable along a second closed path P2, shown schematically in FIG. 2. More specifically, the second closed path P2 shown in FIG. 2 is the path of a central point of the seat 21 of each removing element 17.

The second closed path P2 is at a minimum distance from, for example it overlaps, the trajectory PS of the moulds 6 (or more precisely of a part of the mould 6 which, in the example illustrated, is the male part 28) at least at one point corresponding to a removal position RP, in which a removing element 17 receives an object 11 from the mould 6 for bringing the object 11 towards the outfeed conveyor 18. In the example shown, the second closed path P2 is, in a plan view, tangential to the trajectory PS of the moulds 6 in the removal position RP.

In the example shown, the second closed path P2 has a substantially circular stretch P2C, in which the removing elements 17 convey the objects 11 along a circular arc, thereby keeping substantially constant the distance between the objects 11 and the second axis Z2. The substantially circular stretch P2C is located close to the removal position RP, in particular immediately downstream of the removal position RP.

The second closed path P2 also has an expansion stretch P2E, in which the distance between the objects 11 and the second axis Z2 increases progressively. The expansion stretch P2E is located downstream of the substantially circular stretch P2C. Along the expansion stretch P2E, the cam element 24 moves the removing elements 17 towards the outside of the supporting disc 15, for example in a radial direction relative to the latter, while the supporting disc 15 rotates about the second axis Z2. The objects 11 are thus moved towards the periphery of the supporting disc 15 and then pass over the intermediate support 19. From the latter, the objects 11 are transferred onto the outfeed conveyor 18. The expansion stretch P2E of the second path P2 therefore allows the objects 11 to be positioned along a centre line of the outfeed conveyor 18.

Downstream of the expansion stretch P2E, the second closed path P2 comprises a return stretch P2R, along which the removing elements 17 move radially relative to the supporting disc 15, in such a way as to move towards the second axis Z2. This ensures that, when each removing element 17 returns to the removal position RP, the removing element 17 is axially aligned with the mould 6, or almost.

The moulds 6 move along the trajectory PS in a direction of rotation or movement direction RS which, in the example shown, is clockwise.

The conveying elements 9 move along the closed path P1 in a first direction of rotation or first advancement direction R1, which is opposite to the direction of rotation RS of the moulds 6 and is therefore, in the example illustrated, anticlockwise.

The removing elements 17 move along the second closed path P2 in a second direction of rotation or second advancement direction R2 which is opposite to the direction of rotation RS of the moulds 6 and is therefore anticlockwise, in the example shown.

By providing opposite directions of rotation between the conveying elements 9 and the moulding carousel 5, the time during which a conveying element 9 remains superimposed on a corresponding male part 28 can be maximized, so as to make easier transferring the dose 10 to the mould part 28 even when the apparatus 1 works at a high production speed.

Similarly, by providing opposite directions of rotation between the removing elements 17 and the moulding carousel 5, the time which is made available to each removing element 17 for receiving an object 11 from a corresponding mould 6 can be maximized, so that the removing elements 17 can more easily engage with the objects 11 even when the apparatus 1 is working at a high production speed.

In the example shown, the first closed path P1 is arranged at a lower level than the second closed path P2. The conveying elements 9 move at a height lower than the height at which the removing elements 17 move. In particular, the first closed path P1 and the second closed path P2 may lie in respective planes parallel to each other. The plane on which the first closed path P1 lies is, in the example shown, at a lower level than the plane on which the second closed path P2 lies.

As shown in FIG. 2, the second closed path P2 overlaps the first closed path P1 at two overlap points O1 and O2. The overlap points O1, O2 are distinct and spaced from each other. More specifically, the first overlap point O1 is close to the removal position RP and the delivery position DP and could, for example, be located immediately upstream of the removal position RP, or immediately downstream of the latter. The second overlap point O2 is, on the other hand, positioned upstream of the dispensing device 2, for example in a zone interposed between the expansion stretch P2E and the return stretch P2R of the second closed path P2. It follows that the first closed path P1 and the second closed path P2 do not overlap at respective portions located upstream and downstream of each of the two overlap points P1, P2.

During operation, the conveying elements 9 move along the first closed path P1. During this movement, each conveying element 9 passes close to the dispensing device 2, particularly below the latter, and collects a dose 10 of polymeric material coming out from the outfeed opening 3 of the dispensing device 2. The conveying element 9 continues to move along the first closed path P1, until reaching the delivery position DP, in which the conveying element 9 delivers the dose 10 to the mould 6, by releasing the dose 10 in the mould 6.

In the delivery position DP, the mould 6 is in an open position, and each conveying element 9 is axially interposed between the male part 28 and the female part 29. In the example shown, in the delivery position DP each conveying element 9 is above the male part 28 and releases the dose 10 in such a way that the latter rests on an upper surface of the male part 28. Subsequently, the conveying element 9 is disengaged from the mould 6, so as to no longer be interposed between the male part 28 and the female part 29. The conveying element 9 continues to move along the first closed path P1 and returns close to the dispensing device 2, from which it collects a new dose 10.

Simultaneously, the removing elements 17 move along the second closed path P2. At a certain time, each removing element 17 reaches the removal position RP, in which the removing element 17 is interposed between the male part 28 and the female part 29 of a mould 6, which is in an open position. In the removal position RP, each removing element 17 collects an object 11 from the corresponding mould 6. More in detail, in the example illustrated, when the mould 6 is opened the object 11 remains associated with the female part 29. The object 11 is detached from the female part 29 and released onto the supporting disc 15, so that it can be conveyed by a removing element 17. The latter, by moving along the second closed path P2, delivers the object 11 to the outfeed conveyor 18 and returns to the removal position RP to receive a new object 11.

As shown in FIG. 2, the delivery position DP is not axially aligned with the removal position RP. The delivery position DP and the removal position RP are defined along the trajectory PS of the moulds 6 and are angularly spaced about the axis A of the moulding carousel 5. More specifically, the delivery position DP and the removal position RP are separated by an angle Q about the axis A of the moulding carousel 5.

In the example shown, the removal position RP is arranged downstream of the delivery position DP relative to the direction of rotation RS of the moulding carousel 5.

This means that, when a removing element 17 receives an object 11 from the mould 6, in particular from the female part 29, a conveying element 9 has already placed a dose 10 in the mould 6, in particular on the male part 28. Consequently, when a removing element 17 interacts with the mould 6, the conveying element 9 has already been disengaged, at least partly, from the mould 6.

This makes it possible to reduce the distance between the female part 28 and the male part 29 in a position of maximum opening of the mould, that is to say, in a position in which the female part 28 and the male part 29 are at the maximum distance from each other. In fact, it is not necessary for the conveying element 9 and the removing element 17 to be simultaneously interposed between the female part 28 and the male part 29.

As shown in FIG. 2, although the first axis Z1 and the second axis Z2 do not coincide, and consequently the first closed path P1 and the second closed path P2 are offset from each other, the first axis Z1 and the second axis Z2 are in any case close to each other. The delivery position DP and the removal position RP are not very far from each other. In fact, the angle Q is relatively small, in particular less than 20°, preferably less than 10°. This ensures that an effective cooling of the object 11 is not adversely affected, because the angle Q corresponds to a portion of trajectory PS of the moulds 6 in which the object 11 is not cooled with maximum efficiency. In fact, in the portion of trajectory PS corresponding to the angle Q, the object 11 is still in contact with the female part 29, but has already been separated from the male part 28, on which a new dose 10 has already been deposited. In this portion of trajectory PS, the object 11 can therefore only benefit from the cooling action performed by the female part 29, in which there is a cooling circuit, but not from the cooling action performed by the male part 30. The object 11 is in any case effectively cooled, because the angle Q is small and the temperature of the object 11 is not significantly affected by the fact that it has been prematurely separated from the male part 28.

As shown in FIGS. 2, 3 and 10, the first closed path P1 passes below the outfeed opening 3, in such a way that the conveying elements 9 can, in sequence, collect corresponding doses 10 from the dispensing device 2. The second closed path P2 is laterally displaced relative to the outfeed opening 3, so that the removing elements 17 do not pass below the outfeed opening 3, that is to say, the removing elements 17 are never aligned with the outfeed opening 3 along the outfeed direction E: Tnus, it is avoided that the removing elements 17 interact with the continuous extrudate 4 which flows out of the outfeed opening 3.

As previously described, the first closed path P1 is circular or, more generally, has at least one circular portion.

Also the second closed path P2 has at least one second circular portion, which in the example shown coincides with the substantially circular stretch P2C.

As visible in FIG. 2, the substantially circular stretch P2C of the second closed path P2 has a radius D2 greater than the radius R1 of the first closed path P1.

More generally speaking, the second circular portion of the second closed path P2 has a radius D2 greater than the radius D1 of the first circular portion of the first closed path P1.

This feature, together with the position of the second axis Z2 which does not coincide with the first axis Z1, allows the second closed path P2 to protrude, in a plan view, from the first closed path P1, in the region in which the outfeed conveyor 18 is provided.

This ensures a greater freedom in choosing the position of the outfeed conveyor 18 and, in particular, in choosing the orientation of the outfeed axis U, which can be such as to minimize the dimensions of the apparatus 1.

Furthermore, since the first closed path P1 and the second closed path P2 overlap at least at one point, more specifically at two overlap points O1, O2, the central support 13 and the central body 14 may be positioned relatively close to each other. This makes it possible to use a single motor to rotate about the respective axes Z1, Z2 both the central support 13 of the conveying device 8 and the central body 14 of the removing device 12. As shown in FIGS. 1 and 3, the apparatus 1 comprises a motor 30 arranged to rotationally drive both the central support 13 and the central body 14. The motor 30 has a drive shaft 31 which may extend along an axis coinciding with the first axis Z1 or with the second axis Z2. In the example shown, the drive shaft 31 extends along the first axis Z1, so that the motor 30 directly drives the central support 13, by rotating it about the first axis Z1. A transmission device 32 is further provided, shown in FIG. 7, for transmitting motion from the central support 13 to the central body 14, that is to say, from the conveying device 8 to the removing device 12. In the example shown, the transmission device 32 is a gear transmission device. In particular, the transmission device 32 comprises a first gear wheel 33, rotatable about the first axis of rotation Z1. The first gear wheel 33 is fixed relative to the drive shaft 31 and to the central support 13 of the conveying device 8.

The transmission device 32 further comprises a second gear wheel 34, rotatable about the second axis of rotation Z2 and fixed relative to the central body 14 of the removing device 12.

The transmission device 32 further comprises an intermediate gear wheel 35, interposed between the first gear wheel 33 and the second gear wheel 34, and designed to transmit the rotary movement from the drive shaft 31 to the central body 14 of the removing device 12.

During operation, the motor 30, through the drive shaft 31, rotates the central support 13 of the conveying device 8 in the first direction of rotation R1. The conveying elements 9 are thus moved along the first closed path P1. The first gear wheel 33, which is coaxial with the drive shaft 31, rotates together with the latter and causes the intermediate gear wheel 35 to rotate, in a direction of rotation which is opposite relative to the first direction of rotation R1. The intermediate gear wheel 35 in turn rotates the second gear wheel 34, in the second direction of rotation R2 which is concordant with the first direction of rotation R1. The central body 14 of the removing device 12 is thus rotated about the second axis Z2, and consequently the removing elements 17 move along the second closed path P2.

The transmission device 32 therefore allows both to transmit motion from the central support 13 to the central body 14 with the correct transmission ratio and to rotate the central support 13 and the central body 14 with the same directions of rotation.

In an alternative embodiment not illustrated, it is possible to use a transmission device 32 of a different type from that shown, for example comprising a transmission belt.

As already mentioned, each conveying element 9 performs, in addition to the first movement (which is a rotational movement about the first axis Z1 of the central support 13), a second movement, which is a rotational movement about an axis of rotation R of the conveying element 9 considered.

As shown in FIG. 6, in order to perform the second movement, in the example illustrated, each conveying element 9 is supported by a component 36. A plurality of components 36 are provided, the components 36 being positioned in a peripheral region of the central support 13, for example in a fixed position relative to the central support 13. Each component 36 may have an 'L' shape.

Each component 36 supports a conveying element 9, rotatably connected to the component 36 by a pin 37. Each pin 37 extends along the axis of rotation R of the corresponding conveying element 9.

Each axis of rotation R is positioned transversely, in particular perpendicularly, relative to the first axis Z1. The axes of rotation R may lie in a single plane and be, for example, positioned radially relative to the first axis Z1.

Each conveying element 9 is delimited by a conveying surface 38 intended to come into contact with the dose 10 for conveying the dose towards the mould 6.

In the example shown the conveying surface 38 is flat. This shape of the conveying surface 38 is particularly suitable for conveying doses 10 having a parallelepiped shape, as shown in FIG. 6. The conveying surface 38 may however also have shapes which are not flat, for example like a cylinder portion, particularly if the dose 10 is not parallelepiped in shape. The apparatus 1 further comprises a movement device 39, for rotating the conveying elements 9 about the respective axes of rotation R, so that the conveying elements 9 can perform the second movement.

In the example shown, the conveying element 9 is positioned, for most of the first closed path P1, in such a way that the conveying surface 38 is facing downwards, in particular lying on a horizontal plane.

In a region of the first closed path P1, the conveying element 9 passes close to the dispensing device 2, in particular below the outfeed opening 3, from which the continuous extrudate 4 comes out.

Figure 4:
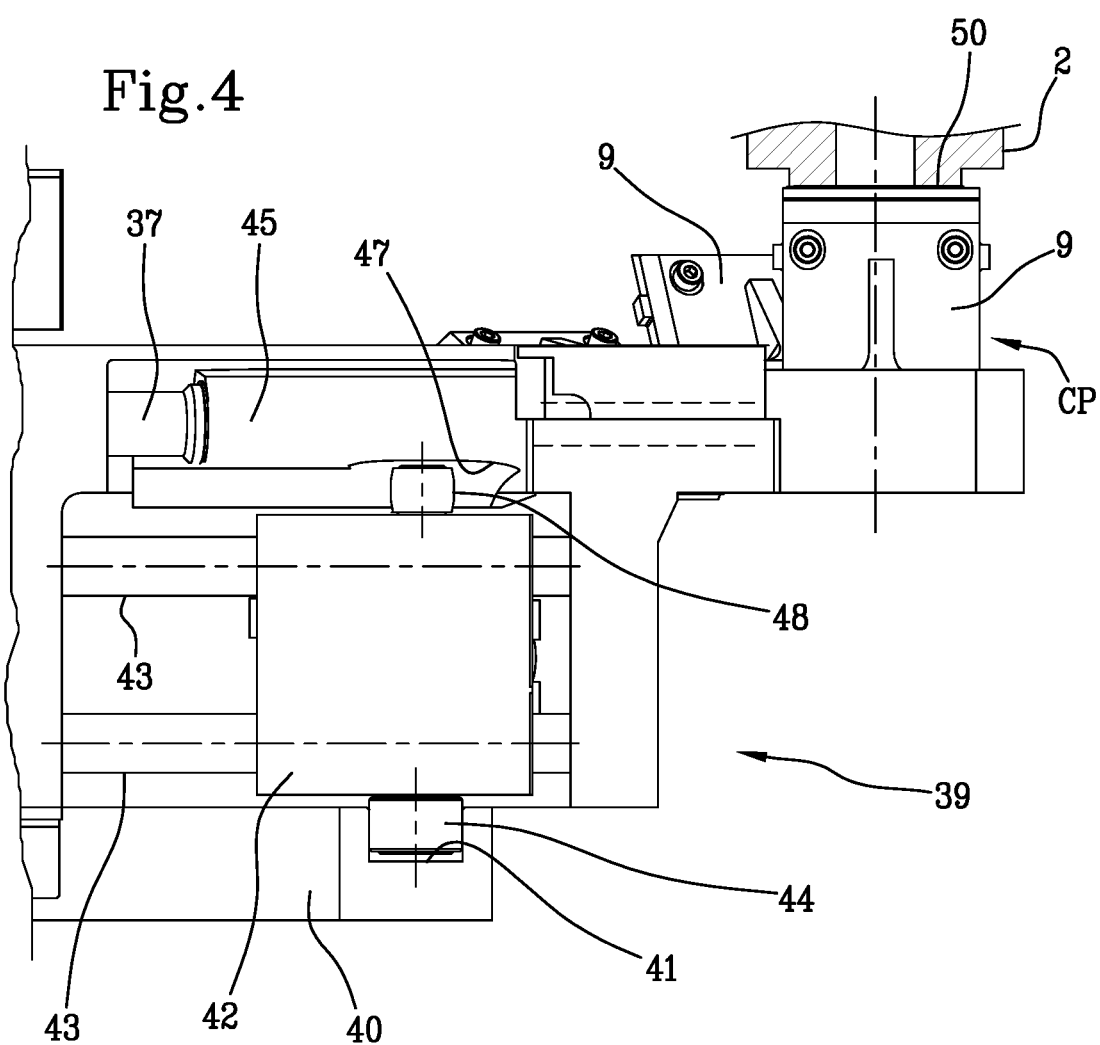
FIG. 4 shows a detail of FIG. 3, in an enlarged view, highlighting a movement device for driving a conveying element of the apparatus of FIG. 1.
Figure 7:
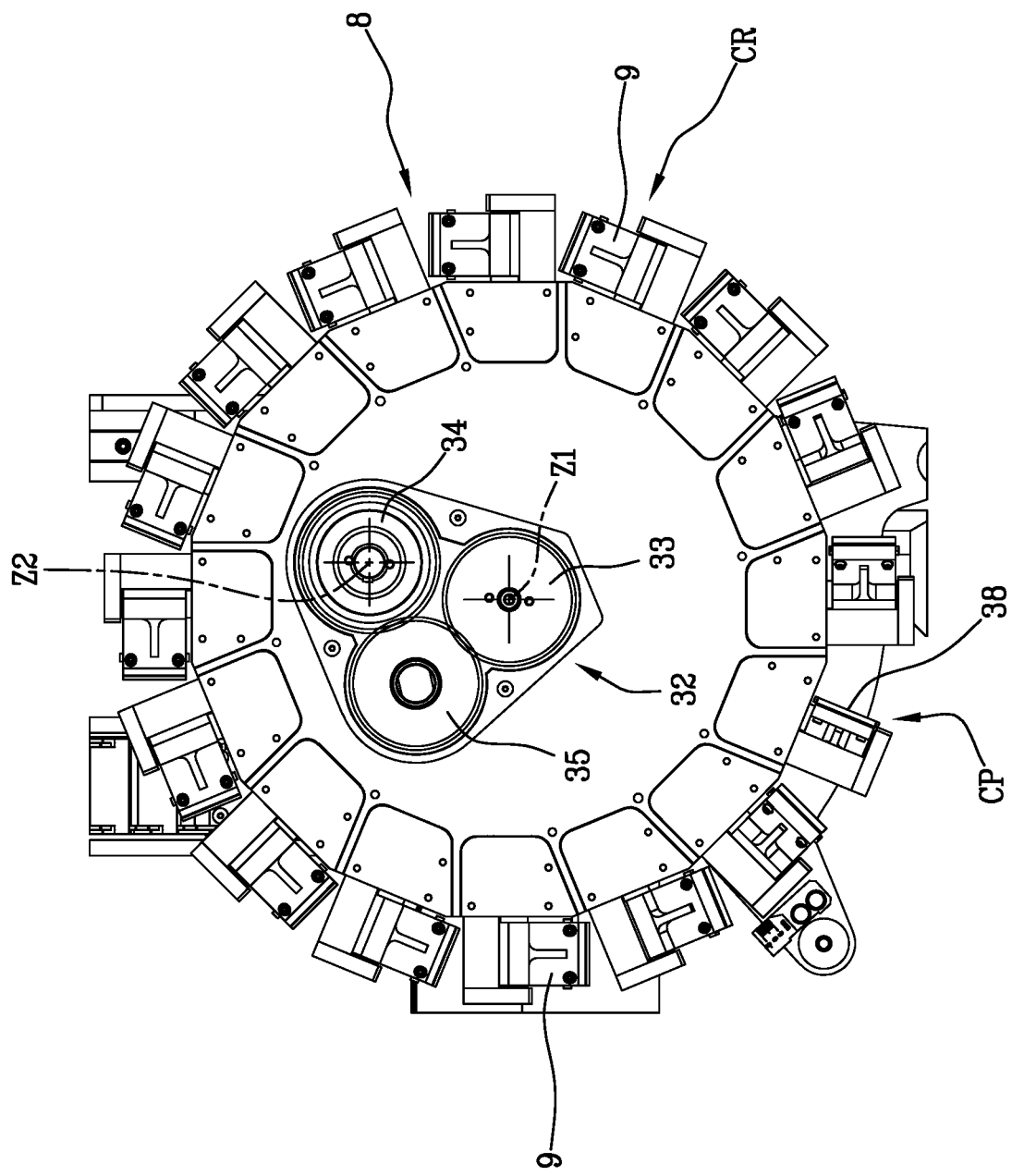
FIG. 7 is a top view of the conveying device of FIG. 6, showing a driving system for driving a removing device and the conveying device of FIG. 6.

Upstream of the dispensing device 2, the conveying element 9 rotates about the respective axis of rotation R, thereby positioning itself in a collecting configuration CP, shown in FIGS. 4, 6 and 7, in which the conveying element 8 collects a dose 10 separated from the continuous extrudate 4. In the collecting configuration CP, the conveying surface 38 may be oriented vertically, or may be oriented slightly backwards relative to the vertical direction.

In this way, the dose 10, which exits from the dispensing device 2 along the substantially vertical outfeed direction E rests, on the conveying surface 38, which is also arranged substantially vertically, adhering consequently to the conveying surface 38 owing to the viscosity of the polymeric material.

The dose 10 is received from the conveying element 9 in the collecting configuration CP, whilst the dose 10 has a first orientation which in the example illustrated is substantially vertical. In an alternative embodiment, the dose 10 might have, in the collecting configuration CP, a non-vertical orientation, for example because the outfeed direction E is not vertical. After receiving the dose 10 in the collecting configuration CP, while the conveying element 9 is moved about the first axis Z1 by the central support 13 (first movement), the conveying element 9 continues to rotate about the corresponding axis of rotation R (second movement). The conveying element 9 rotates about the axis of rotation R until reaching a release configuration CR, shown in FIGS. 6 and 7, in which the dose 10 is released inside the mould 6, for example by placing it on an upper surface of the male part 28. In the release configuration CR, the conveying surface 38 is facing downwards and may be, in particular, substantially horizontal.

In the release configuration R, the dose 10 has a second orientation which makes it suitable to be released in the mould 6.

After having released the dose 10 in the mould element 6, the conveying element 9 may remain in the release configuration CR, that is to say, with the conveying surface 38 facing downwards, until the conveying element 9 returns close to the outfeed opening 3 of the dispensing device 2, and upstream of the latter.

The movement device 39 comprises a first cam 40, shown in FIGS. 3 and 4, located in a fixed position on the apparatus 1. The first cam 40 may be shaped like a plate. The first cam 40 has a cam profile 41, for example shaped like a groove made on an upper surface of the first cam 40. The groove may extend, like a closed loop, about the first axis Z1. The cam profile 41 may extend perpendicularly to the first axis Z1.

The movement device 39 further comprises, for each conveying element 9, a carriage 42, movable along at least one sliding guide 43 along a sliding direction S1 which may be positioned radially relative to the first axis Z1. In the example shown, two sliding guides 43 are provided, positioned at different heights to each other. The sliding guides 43 may be shaped like rectilinear rods. The sliding guides 43 are fixed relative to the central support 13.

A first cam follower 44 is fixed to each carriage 42, the first cam follower 44 being in particular mounted on a lower surface of the carriage 42. The first cam follower 44 may be a wheel that is free to rotate, for example having an axis parallel to the first axis of rotation Z1.

Figure 5:
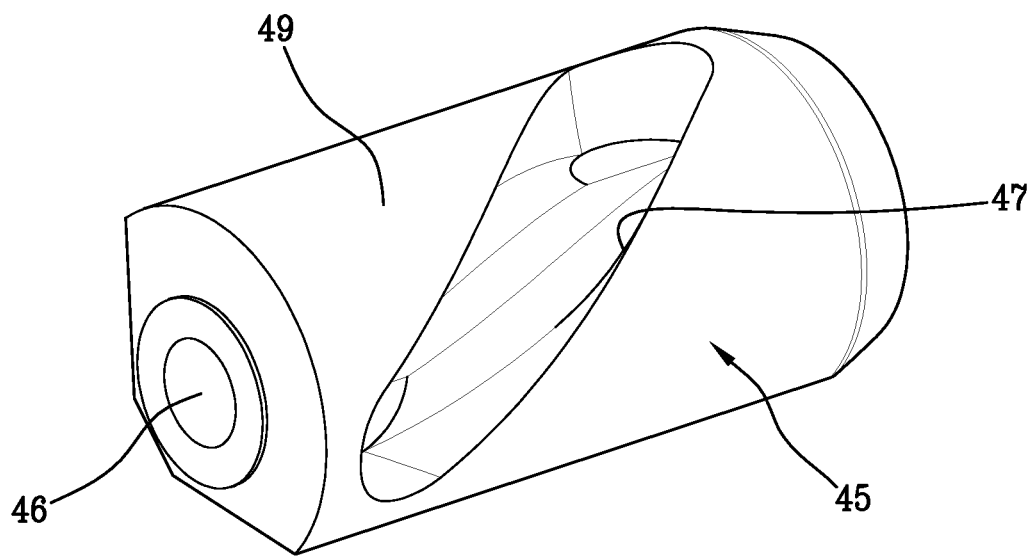
FIG. 5 is a perspective view showing a cam of the movement device shown in FIG. 4.

The movement device 39 further comprises, for each conveying element 9, a further cam 45 illustrated schematically in FIG. 4 and with greater precision in FIG. 5.

The further cam 45 is shaped like an elongate body which extends along the axis of rotation R of the corresponding rotating element 8. More precisely, the further cam 45 has a hole 46 inside of which the pin 37 can be received. The further cam 45 is mounted in such a way as to be fixed relative to the pin 37 and to the conveying element 9 to which it is associated.

On the further cam 45 there is a guiding profile 47 in which a second cam follower 48 can engage, the second cam follower 48 being supported by the carriage 42.

The guiding profile 47 may be a helical profile which extends about the axis of rotation R. The guiding profile 47 may be shaped like a groove made on an outer surface of the further cam 45.

In the example shown, the guiding profile 47 is made on a portion of cylindrical surface 49 of the further cam 45. The further cam 45 is also delimited by flat surfaces, positioned adjacent to the portion of cylindrical surface 49 and extending parallel to the axis of rotation R.

The further cam 45 is mounted in such a way that it is rotatable about the corresponding axis of rotation R, together with the pin 37 and the conveying element 9 relative to which it is fixed. However, the further cam 45 cannot slide along the corresponding axis of rotation R.

The second cam follower 48 is provided on a surface of the carriage 42 opposite to the surface of the carriage 42 on which the first cam follower 44 is mounted. In the example shown, the second cam follower 48 is therefore mounted on an upper surface of the carriage 42 and projects from that surface, so as to engage with the guiding profile 47. The second cam follower 48 may be shaped like a roller which can rotate freely about an axis parallel to the first axis Z1.

During operation, the motor 30 rotates the central support 13 continuously about the first axis Z1, to move the conveying elements 9 along the first closed path P1. The carriages 42, which are supported by the central support 13, are also rotationally moved about the first axis Z1. While the carriages 42 move about the first axis Z1, the corresponding first cam followers 44 move along the cam profile 41 of the first cam 40, which, on the other hand, is in a fixed position on the apparatus 1. Since the points of the cam profile 41 are arranged at a distance from the first axis Z1 which is not constant along the cam profile 41, the first cam 40 moves each carriage 42 forwards and backwards along the corresponding sliding guides 43. In this way, each second cam follower 48 moves along the guiding profile 47 of the corresponding further cam 45. Since the guiding profile 47 is helical, or, more generally, is not parallel to the corresponding axis of rotation R, whilst the second cam follower 48 moves along the guiding profile 47, the corresponding further cam 45 is rotated about the axis of rotation R, which causes the rotation, or, more specifically, the oscillation, of the respective conveying element 9 between the collecting configuration CP and the release configuration CR (second movement of the conveying element 9). This makes it possible for the conveying element 9 to collect the dose 10 coming from the dispensing device 2 while the dose 10 is positioned in the first orientation, and to place the dose 10 in a mould 6 while the dose 10 is positioned in the second orientation.

The combination of the first cam 40, which acts on all the conveying elements 9, and the further cams 45, which are provided in a number equal in number to the number of conveying elements 9, since each conveying element 9 is associated with a further cam 45, allows the conveying elements 9 to be moved between the collecting configuration CP and the release configuration CR in a reliable and simple manner. In particular, for operation of the movement device 39, particularly complicated adjustment operations are not required. Moreover, the movement device 39 is relatively robust and is not subject to easy breakage.

The movement device 39 of the type described above with reference to FIGS. 3 to 5 may also be used in apparatuses 1 in which the central support 13 of the conveying device 8 and the central member 14 of the removing device 12 are coaxial, that is to say, in traditional apparatuses 1 in which the first axis Z1 and the second axis Z2 are coincident with each other.

The apparatus 1 further comprises at least one separating element 50 for separating the doses 10 from the continuous extrudate 4.

In the example shown, a plurality of separating elements 50 is provided, each separating element 50 being associated with a conveying element 9, in particular supported by the conveying element 9. For example, as shown in FIG. 6, each separating element 50 may be shaped like a cutting edge which delimits the conveying surface 38.

When the separating element 50 passes below the outfeed opening 3 of the dispensing device 2, the separating element 50 cuts a dose 10, in particular by scraping it from the outfeed opening 3. The dose 10 remains adhered to the conveying element 9, particularly to the conveying surface 38, so as to be conveyed towards the mould 6.

The separating elements 50 may be of a shape different to that shown.

For example, each separating element 50 might comprise a blade fixed to the conveying element 9.

It is also possible to provide a separating element 50 independent of the conveying elements 9, in particular a separating element positioned upstream of the conveying elements 9 and distinct from the latter, for example a blade which rotates in a position interposed between the dispensing device 2 and the conveying elements 9, or a laser beam.

If the outfeed opening 3 has a rectangular or square shape, the dose 10 separated from the continuous extrudate 4 has a parallelepiped shape. In this case, a face of the parallelepiped, for example the face having the largest area with respect to the other faces, adheres to the conveying surface 38 during conveying of the dose 10 towards the mould 6.

The conveying element 9 may be provided with suction means, which can be activated selectively to retain the dose 10 in contact with the conveying surface 38 during conveying.

The conveying element 9 may further be provided with blowing means which can be activated selectively to make easier the detachment of the dose 10 from the conveying surface 38, so that the dose 10 can be delivered to the mould 6.

FIG. 8 shows a conveying element 109 according to an alternative embodiment, in which suction means and/or the blowing means are provided. In this case, a plurality of passage holes 51 open onto the conveying surface 38 of the conveying element 9, the holes 51 being intended to establish a fluid communication between the dose 10 which interacts with the conveying surface 38 and a vacuum source (included in the suction means) or alternatively a source of compressed air (included in the blowing means). The holes 51 are connected to the vacuum source when the conveying element 109 is about to collect or has just collected a dose 10 from the dispensing device 2, in such a way that the dose 10 remains attached to the conveying surface 38 without undergoing unwanted deformations. The holes 51 may also remain connected to the vacuum source whilst the dose 10 is conveyed towards the mould 6, in particular if the dose 10 is conveyed by the conveying surface 38 positioned in a substantially horizontal configuration. In this way, the dose 10 remains attached to the conveying surface 38 even if the latter is facing downwards.

When the dose 10 has to be released in the mould 6, the holes 51 can be connected to the source of compressed air, so as to supply compressed air which makes easier detaching the dose 10 from the conveying surface 38. The compressed air furthermore allows the conveying surface 38 to be kept clean, that is to say, free of any residues of polymeric material, and to avoid that the conveying surface 38 is excessively heated due to the heat released from the dose 10.

The holes 50 may be circular and have a diameter less than, or equal to, 0.2 mm. A so small transversal dimension of the holes 50 prevents those holes from leaving marks on the dose 10.

The holes 51 may be formed on an insert 52 housed in a corresponding seat made on the conveying element 9. The insert 52 at least partly defines the conveying surface 38. The insert 52 is delimited by a surface, intended to come into contact with the dose 10, which is flush with the surrounding surface of the conveying element 9.

The insert 52 may be made of aluminium. The separating element 50, and more generally speaking the entire body of the conveying element 9 having the seat which houses the insert 52, may be made of steel. It has been found experimentally that this combination of materials makes it possible to obtain a good behaviour of the conveying element 9, with regard to the capacity of the dose 10 to adhere to the conveying surface 38 and be detached from the latter at the appropriate moment. Moreover, the combination of materials mentioned above may help to maintain a correct temperature of the dose 10 during conveying.

In an alternative embodiment, shown in FIG. 9, a conveying element 209 is provided which comprises a pushing element 53, that is to say, a mechanical element which, at the suitable moment, pushes the dose 10 downwards, thereby helping the dose 10 to detach from the conveying surface to be released in the mould 6.

The conveying element 59 has a conveying surface 238, intended to come into contact with the dose 10 whilst the latter is conveyed towards the mould 6, which is defined partly by a contact surface 54 which delimits the pushing element 53, and partly by a surrounding surface 55 of the conveying element 9, which surrounds the pushing element 53.

The pushing element 53 is movable between a retracted position, shown in FIG. 9, and a protruding position, not illustrated. In the retracted position, the contact surface 54 is positioned flush with the surrounding surface 55 to define the conveying surface 238. In the protruding position, the contact surface 54 protrudes relative to the surrounding surface 55, so that the pushing element 53 acts on the dose 10 thereby detaching it from the surrounding surface 55 in such a way that the dose can more easily fall onto an underlying part of the mould 6.

The pushing element 53 is moved in the protruding position when the conveying element 9 is interposed between a male part and a female part of the mould 6, so that the dose 10, which detaches from the conveying element 9 owing to the pushing element 53, is deposited directly in the mould 6.

The pushing element 53 could be provided with suction means and/or blowing means, not illustrated, for retaining the dose 10 in contact with the conveying surface 238 and/or facilitating the detachment of the dose 10 from the conveying surface 238.

The embodiments of the conveying elements described above and shown with reference to FIGS. 8 and 9 can also be used in apparatuses in which the central support 13 of the conveying device 8 and the central body 14 of the removing device 17 are coaxial, that is to say, in apparatuses in which the first axis Z1 coincides with the second axis Z2. As mentioned above, the continuous extrudate 4 may be made from a single material, or multilayer, that is to say, made up of a plurality of layers of polymeric materials different to each other. If the continuous extrudate 4 is multilayer, the dose 10 separated from the continuous extrudate 4 also has a multilayer structure. In the example shown, the dose 10, as shown in FIG. 6, has an intermediate layer 56, indicated in black in the drawings, interposed between two outer layers 57, indicated in white in the drawings. The intermediate layer 56 can be formed by a material having barrier properties, for example to oxygen, and/or gases, and/or light.

In the example shown the intermediate layer 56 has a flat shape. While the dose 10 is conveyed by the conveying element 9, the intermediate layer 56 is parallel to the conveying surface 38.

The apparatus 1 described above is a particularly versatile apparatus, which may be used for producing, by compression moulding, objects made of a single material or having a multilayer structure according to different geometries.

In the apparatus 1, the conveying device 8 and the removing device 12 may be mounted on a common support.

The apparatus 1 may further comprise movement means connected to the common support and configured to move the common support (and hence to simultaneously move the conveying device 8 and the removing device 12) between a first operative position and a second operative position.

In the first operative position, the common support positions the conveying device 8 and the removing device 12 near the moulding carousel 5, so that the apparatus 1 may regularly produce the objects 11. In the second operative position, the movement means move the common support away from the moulding carousel 5, so that it is possible to perform, for example, maintenance or repairing operations on components of the apparatus 1 such as the moulds 6.

The movement means can be of the kind disclosed in the international patent application WO 2011/010294.

Owing to the common support which supports the conveying device 8 and the removing device 12, the movement means allow to quickly move both the conveying device 8 and the removing device 12 away from the moulding carousel 5, in case of emergency or whenever there is the need to do so.

In conclusion, according to a second aspect of the invention, an apparatus is provided comprising at least one conveying element (9; 109; 209) for conveying a dose (10) of polymeric material dispensed by a dispensing device (2) towards a mould (6), the conveying element (9; 109; 209) being configured to perform a first movement by moving along a path (P1) directed from the dispensing device (2) towards the mould (6), so as to bring the dose (2) to the mould (6), and wherein the conveying element (9; 109; 209) is configured to perform, in addition to the first movement, a second movement by rotating about an axis (H), so as to turn the dose (10) from a first orientation with which the dose (10) is received by the conveying element (9; 109; 209), to a second orientation with which the dose (10) is released by the conveying element (9; 109; 209) in the mould (6), the apparatus (1) further comprising a movement device (39) for moving said at least one conveying element (9; 109; 209) during the second movement, the movement device (39) comprising two cams (40, 45) operating in conjunction with each other so that said at least one conveying element (9; 109; 209) rotates about said axis (R) while it moves along said path (P1).

In an embodiment, the movement device (39) further comprises a carriage (42) associated with the conveying element (9; 109; 209).

The carriage (42) may be slidably supported by a central support (13), which supports the conveying element (9; 109; 209).

Said two cams (40, 45) may comprise a first cam (40) located in a fixed position for moving the carriage (42) away from, or towards, a first axis (Z1) about which the central support (13) is rotatable.

In an embodiment, said two cams (40, 45) comprise a further cam (45) fixed relative to the conveying element (9; 109; 209), the further cam (45) being able to oscillate about the axis of rotation (R) by means of the carriage (42).

In an embodiment, the carriage (42) supports a first cam follower (44) which can engage with a cam profile (41) of the first cam (40) and a second cam follower (48) which can engage with a guiding profile (47) of the further cam (45). The guiding profile (47) may be helical.

The invention claimed is:

1. An apparatus comprising:
   at least one mould for forming an object from a dose of polymeric material;
   a conveying device having a central support rotatable about a first axis, the conveying device comprising at least one conveying element movable along a first closed path for collecting the dose and subsequently releasing the dose in the at least one mould;
   a removing device having a central body rotatable about a second axis, the removing device comprising at least one removing element movable along a second closed path, the at least one removing element being configured to convey the object from the at least one mould towards an outfeed conveyor;
   wherein the first axis is distinct from the second axis and at least one point exists at which one path selected from between the first closed path and the second closed path overlaps another path selected from between the second closed path and the first closed path; and
   wherein the at least one mould is movable in a movement direction, the at least one conveying element is movable along the first closed path in a first advancement direction, the at least one removing element is movable along the second closed path in a second advancement direction opposite relative to the movement direction, wherein the first advancement direction is opposite relative to the movement direction;
   said conveying element being further rotatable about an axis of rotation positioned transversally to the first axis, so as to turn the dose from a first orientation with which the dose is received by the conveying element, to a second orientation with which the dose is released by the conveying element in the mould;
   wherein the apparatus further comprises two cams for moving the conveying element between the first orientation and the second orientation, the two cams operating in conjunction with each other so that the conveying element rotates about the axis of rotation while it moves along the first closed path; and
   wherein a carriage is associated with the conveying element, the carriage being slidably supported by the central support, said two cams comprising a first cam arranged in a fixed position for moving the carriage away from, or towards, the first axis, said two cams comprising a further cam which is fixed relative to the conveying element, the further cam being caused to oscillate about the axis of rotation by the carriage.

2. An apparatus according to claim 1, wherein the mould comprises a male part and a female part, the removing element being configured to receive the object in a removal position in which the removing element is interposed between the male part and the female part.

3. An apparatus according to claim 1, and further comprising a dispensing device for dispensing the polymeric material, the dispensing device having an outfeed opening facing downwards for dispensing a continuous extrudate of polymeric material in an outfeed direction, the conveying element being configured to pass below the outfeed opening so as to collect the dose.

4. An apparatus according to claim 3, wherein adjacent the outfeed opening the second closed path is laterally displaced relative to the first closed path, so as to prevent the removing element from being vertically aligned with the outfeed opening along the second closed path and avoid interference between the removing element and the continuous extrudate.

5. An apparatus according to claim 1, wherein the mould comprises a male part and a female part, the male part being positioned below the female part.

6. An apparatus according to claim 1, wherein the first closed path comprises at least a first circular portion, the second closed path comprising at least a second circular portion, the first circular portion having a radius which is smaller than a radius of the second circular portion.

7. An apparatus according to claim 1, wherein said path selected from between the first closed path and the second closed path overlaps the other path selected from between the second closed path and the first closed path at two points which are distinct and at a distance from each other, and wherein the first closed path and the second closed path do not overlap each other in respective portions positioned upstream and downstream of each of said two points.

8. An apparatus according to claim 1, wherein:
   the mould is movable along a trajectory;
   a delivery position is defined along the trajectory, the mould being adjacent the conveying element in the delivery position, so that the conveying element releases the dose in the mould;
   a removal position is defined along the trajectory, the mould being adjacent the removing element in the removal position, so that the removing element receives the object from the mould for moving the object away from the mould;
   the delivery position is distinct from the removal position.

9. An apparatus according to claim 8, wherein the delivery position is defined along the trajectory upstream of the removal position with respect to a movement direction of the mould along the trajectory.

10. An apparatus according to claim 8, wherein the trajectory extends about a central axis, the delivery position and the removal position being arranged at an angular distance from each other less than, or equal to, 20°, calculated about the central axis.

11. An apparatus according to claim 1, wherein the second closed path is positioned at a higher level than the first closed path.

12. An apparatus according to claim 1, wherein the first closed path is a circular path.

13. An apparatus according to claim 1, wherein the outfeed conveyor is positioned downstream of the removing device, the second closed path having a non-circular portion configured in such a way that the removing element gradually moves the object away from the second axis to deliver the object to the outfeed conveyor.

14. An apparatus according to claim 1, wherein the central support and the central body are driven to rotate about the first axis and respectively about the second axis by a common motor.

15. An apparatus according to claim 14, and further comprising a gear transmission through which the common motor can rotate the central support and the central body.

16. An apparatus according to claim 1, wherein the carriage supports a first cam follower engageable with a cam profile of the first cam and a second cam follower engageable with a guiding profile of the further cam.

* * * * *